US007196525B2

(12) United States Patent
Sparkman et al.

(10) Patent No.: US 7,196,525 B2
(45) Date of Patent: Mar. 27, 2007

(54) SAMPLE IMAGING

(76) Inventors: O. David Sparkman, 5354 Thunderbird Ct., Antioch, CA (US) 94531; Steven M. Colby, P.O. Box 52033, Palo Alto, CA (US) 94303

(*) Notice: Subject to any disclaimer, the term of this patent is extended or adjusted under 35 U.S.C. 154(b) by 0 days.

(21) Appl. No.: 11/382,017

(22) Filed: May 6, 2006

(65) Prior Publication Data

US 2006/0250138 A1 Nov. 9, 2006

Related U.S. Application Data

(60) Provisional application No. 60/700,884, filed on Jul. 19, 2005, provisional application No. 60/680,658, filed on May 14, 2005, provisional application No. 60/678,428, filed on May 6, 2005.

(51) Int. Cl.
*G01N 27/62* (2006.01)

(52) U.S. Cl. .................................................... 324/464

(58) Field of Classification Search ................ 324/464, 324/465; 250/442.11, 282
See application file for complete search history.

(56) References Cited

U.S. PATENT DOCUMENTS 2,709,222 A * 5/1955 Lawrence .................. 250/284
5,663,561 A * 9/1997 Franzen et al. ............. 250/288
5,821,548 A * 10/1998 Hinchliffe .............. 250/492.21
6,124,675 A * 9/2000 Bertrand et al. ........ 315/111.91
6,617,575 B1* 9/2003 Cramer ....................... 250/288
6,744,041 B2 6/2004 Sheehan et al.
6,888,132 B1 5/2005 Sheehan et al.
2002/0011560 A1 1/2002 Sheehan et al.
2004/0245458 A1 12/2004 Sheehan et al.
2005/0035287 A1* 2/2005 Jolliffe et al. ............... 250/288
2005/0056775 A1 3/2005 Cody et al.
2005/0056776 A1 3/2005 Willoughby et al.
2005/0189487 A1 9/2005 Iwamoto
2005/0196871 A1 9/2005 Cody et al.
2005/0230635 A1 10/2005 Takats et al.
2005/0258353 A1 11/2005 Berkout et al.
2006/0071665 A1* 4/2006 Blake et al. ................ 324/464
2006/0151689 A1 7/2006 Bateman et al.

* cited by examiner

*Primary Examiner*—Anjan Deb

(57) ABSTRACT

Systems and methods of generating ions at atmospheric pressure are presented. These systems and methods include spatially dependent analysis of a sample using an effusive ionization source. Systems and methods of isolating samples at atmospheric pressure are presented. These systems and methods include using a barrier to prevent metastables or electrons from an effusive ion source from reaching a sample unless the sample is in an analysis position. Systems and methods of using metastables in collisionally induced dissociation are presented.

24 Claims, 13 Drawing Sheets

SAMPLE IMAGING

CROSS-REFERENCE TO RELATED APPLICATIONS

This application claims benefit of and priority to U.S. provisional patent application No. 60/678,428 filed May 6, 2005 and entitled "RFID Device"; U.S. provisional patent application No. 60/680,658 filed May 14, 2005 and entitled "Metastable CID"; and U.S. provisional patent application No. 60/700,884 filed Jul. 19, 2005 and entitled "Electronically Switchable RFID." The disclosures of the above applications are hereby incorporated herein by reference.

BACKGROUND

1. Field of the Invention

The invention is in the field of analytical chemistry and more specifically in the filed of mass spectrometry.

2. Related Art

A New DART™ ionization source has been developed by Robert B. Cody. See U.S. Pat. No. 6,949,741 to Cody et al and U.S. application publication 2005/0196871 A1, the disclosures of which are hereby incorporated herein by reference. The above patent a publication teach a metastable/electron source capable of generating either electrons or metastables for atmospheric pressure ionization.

Collisional Induced Dissociation (CID) is a method used to generate product ions in mass spectrometry (MS). CID is used to generate product ion mass spectra of ions that have already be separated on the basis of mass, mass-to-charge value (m/z), collisional cross-section, time-of-flight, frequency, position, or the like. For example, in MS/MS or $MS^n$. CID uses a collision gas to collide with an analyte. The collision imparts energy to the analyte resulting in fragmentation and the production of product ions.

SUMMARY

The inventions described herein make use of the DART ionization source described in U.S. patent application 2005/0056775. Some embodiments use the DART source in a spatially resolved manner. Some embodiments use the DART source for fragmentation of ions already separated as a function of mass, collision cross-section, or mass-to-charge value.

Various embodiments of the invention includes a method of imaging a sample, the method comprising (a) placing the sample in a position relative to a sample cover, the sample cover including an aperture configured to expose part of a solid sample to an ionization source while preventing exposure of another part of the sample to the ionization source, (b) generating metastables using an atmospheric pressure source, (c) generating ions from the part of the sample exposed by the aperture, using the electrons or metastables, the sample being at atmospheric pressure, (d) measuring the mass-to-charge values (ratios) of the generated ions, (e) storing the measured mass-to-charge values, (f) associating the stored mass-to-charge values with the relative position of the sample cover aperture and the sample, (g) changing the relative positions of the sample cover and the sample, and (h) repeating (b) through (g) to form an image of the sample.

Various embodiments of the invention include a method of generating a mass spectrum, the method comprising generating excited metastables, generating ions, analyzing the generated ions responsive to their m/z value, colliding the analyzed ions with the excited metastables to generate product ions, and analyzing the product ions responsive to their m/z values.

Various embodiments of the invention include a method of generating a mass spectrum, the method comprising generating excited metastables, generating ions, analyzing the generated ions responsive to their collisional cross-sections, colliding the analyzed ions with the excited metastables to generate product ions, and analyzing the product ions responsive to their m/z values.

Various embodiments of the invention include a system comprising an ion source configured to generate precursor ions representing intact molecules, an m/z analyzer configured to separate the precursor ions in time or space, a metastable source configured to generate metastable species a collisional induced dissociation region, configured for fragmenting the separated precursor ions using collisions with the metastable species an interface between the metastable source and the collisional induce dissociation region, the interface configured to maintain a pressure differential between the collisional induced dissociation region and the metastable source, and an ion detection device.

Various embodiments of the invention include a method of analyzing a sample, the method comprising generating first ions from the sample, separating the generated first ions as a function of mass-to-charge value, fragmenting the separated first ions using collisions with neutral species, detecting the fragmented first ions to generate first mass spectral data, generating second ions from the sample, separating the generated second ions as a function of mass-to-charge value, fragmenting the separated second ions using collisions with excited metastables, detecting the fragmented second ions to generate second mass spectral data, and using the first mass spectral data and the second mass spectral data to determine a structure of the first ions.

Various embodiments of the invention include a sample imaging system comprising an atmospheric pressure source configured to generate electrons or metastables for ionization of sample molecules, a sample cover including an aperture and configured isolate a region of a solid sample such that ions are generated from the isolated region of the sample but not an other region of the sample, the isolated region of the sample being at atmospheric pressure, a mechanical element configured to move the relative positions of the aperture and the sample, a mass spectrometer configured to receive the ions and measure their mass-to-charge values, and a computing system configured to control movement of the mechanical element and to associate the measured mass-to-charge values with a relative location of the aperture and the sample.

Various embodiments of the invention include a system comprising a first sample container configured to hold a first sample, a second sample container configured to hold a second sample, the first sample container and the second sample container being configured to be alternatively positioned in an analysis region, an effusive source of electrons or metastables configured to deliver the electrons or metastables to the analysis region, a mass spectrometer configured to analyze ions generated within the analysis region from the first sample or the second sample using the electrons or metastables, and one or more barriers configured to prevent the electrons or metastables from reaching the second sample when the first sample is positioned in the analysis region.

Various embodiments of the invention include a system comprising a first m/z analyzer configured to analyze ions according to their m/z values, an effusive source of excited metastables, and a collision induced dissociation region configured to receive the excited metastables, and configured for collisions between the ions and the excited metastables to occur, the collisions resulting in generation of product ions from the ions.

Various embodiments of the invention include a system comprising an effusive metastable source configured to generate metastables, a first m/z analyzer configured to separate ions according to m/z values, a collision induced dissociation region configured to receive the separated ions and the metastables, a second m/z analyzer configured to receive product ions generated through collisions between the separated ions and the metastables, and to separate the fragment ions according to their m/z values, and a detector configured to detect the separated fragment ions.

Various embodiments of the invention include a system comprising a first m/z analyzer configured to analyze ions according to their m/z values, an effusive source configured to generate thermal negatively charged species, and a collision induced dissociation region configured to receive the negatively charged species, and configured for collisions between the ions and the negatively charged species to occur, the collisions resulting in generation of product ions from the ions.

DETAILED DESCRIPTION

Spatially resolved analysis is advantageous because it can be used to provide information about a particular part of a sample and/or used to generate an image of sample characteristics as a function of position. In some embodiments, spatially resolved analysis is accomplished by placing cover including an aperture (e.g., orifice) over a sample such that one part of the sample is exposed to the ionizing metastables and/or electrons from the DART source while another part of a sample is shielded such that it is not exposed to the ionizing metastables/electrons. To create an image the aperture is moved relative to the sample and the ion signal detected from each of various positions is monitored.

A mesh is optionally placed between the aperture and the sample. For example, in some embodiments, the sample, cover, and mesh form a sandwich with the mesh in contact with both the sample and the cover. In some embodiments, a 333-lines per inch mesh is used to separate the cover and the sample. In other embodiments a 70 line per inch mesh, or some other line/inch, is used. The mesh may be gold or nickel or some other material. Such mesh is available from Buckbee-Meers, Inc in a variety of thicknesses. These meshes may have a 90% ratio of open area to total area, thus allowing gas to pass through the aperture and contact a significant fraction of the sample. In some embodiments, the mesh is configured to prevent direct contact between the sample and the cover, thus avoiding contamination of the cover and/or damage to the sample. In some embodiments, the mesh improves the resolution of the imaging process by reducing the flow of gas between the area of the sample exposed by the aperture and adjacent areas of the sample.

Figure 1:
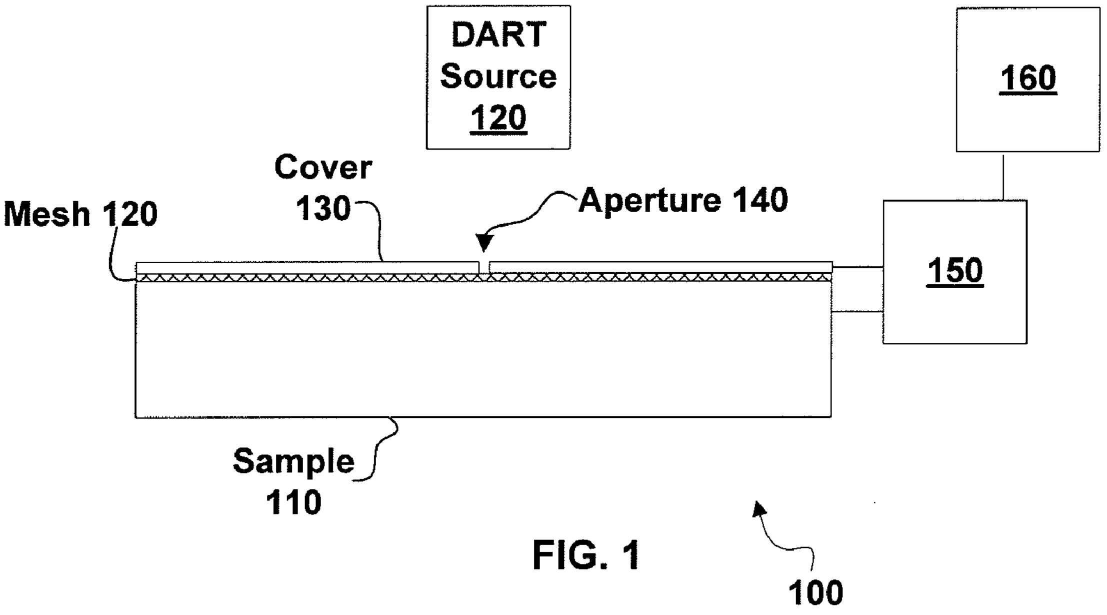
FIG. 1 illustrates a spatially resolved analysis system disposed on a sample, according to various embodiments of the invention.

FIG. 1 illustrates a Spatially Resolved Analysis System, generally designated 100, disposed on a Sample 110. Spatially Resolved Analysis System 100 includes a DART Source 120, an optional Mesh 120, and a Cover 130 including an Aperture 140. DART Source 120 is typically a metastable and/or ion source such as that described in U.S. patent application publication 2005/0056775 A1. DART Source 120 is configured to generate electrons and/or metastables, optionally at atmospheric pressure in an effusive manner.

Cover 130 includes Aperture 140 configured to expose a subset of Sample 110 to the output of DART Source 120 while preventing exposure of other parts of Sample 110. Cover 130 may be moved relative to the sample in order to expose different subsets of Sample 110 at different times. Mesh 120 is optionally disposed between Sample 110 and Cover 130. In some embodiments, Aperture 140 is of a size similar to openings in Mesh 120. Thus, in some embodiments, the spatial resolution of the spatially resolved analysis is on the order of the size of openings in Mesh 120. This size may be 1/30, 1/50, 1/77, 1/100, 1/333 of an inch, or the like. In some embodiments, the spatial resolution of the spatially resolved analysis is dependent on a size of Aperture 140. In some embodiments, Cover 130 is placed in contact with Sample 110. In alternative embodiments, Cover 130 is not in contact with Sample 110 but is disposed less than or equal to 0.5, 1.0, 1.5, 2.0, 5.0, 10, 20 or 50 mm from Sample 110. In some embodiments, Cover 130 is placed in contact with Mesh 120 and Mesh 120 is placed in contact with Sample 110. Mesh 120 is optionally charged in order to attract electrons and/or repel positively charged ions.

Embodiments of the invention optionally include a Mechanical Element 150 configured to move Sample 110 or Aperture 140 relative to each other. This mechanical elements may include stepper motors, PZTs, pneumatics, or the like. Some embodiments include a mass spectrometer configured to analyze ions generated from the surface of Sample 110 using the output of DART Source 120. In one implementation, motion of the relative positions of Aperture 140 and collection of the generated ions are managed by a Computing Device 160. For example, mass spectra may be recorded at each of a plurality of relative positions. These mass spectra may then be processed to form an image of the chemical composition of Sample 110.

Mesh is optionally charged so as to attract electrons to the sample and/or repel resulting ions away from the sample. For example, the mesh may be negatively charged relative to Cover 130 and/or part of DART Source 120 such that electrons are attracted to the mesh and sample from the source. This same potential may be selected to repel positive ions from the sample to an inlet of a mass spectrometer.

The system disclosed in U.S. patent application 2005/0056775 A1 is configured for a sample to be place between DART Source 120 and an inlet to the mass spectrometer. In this configuration, an ion generated on one surface of a solid sample must find its way around the sample to reach the inlet. Among other disadvantages, this limits the size of samples that can be analyzed, reduces sensitivity, and/or is impractical for imaging applications discussed herein.

In the current invention, the metastable/electron output of DART Source 120 and the inlet are optionally disposed such that they both face the same surface of Sample 110. Thus, in some embodiments of the invention, the metastable/electron source and the MS (mass spectrometer) inlet are disposed such that sample need not be place between them.

FIGS. 2A–2E illustrate several embodiments in which the output of DART Source 120 and an MS Inlet 210 both face a same Sample Surface 220. In some embodiments, DART Source 120 and MS Inlet 210 are each disposed such that their center axes intersect at a point where the surface of a sample may be positioned. In some embodiments, DART Source 120 is configured such that a point on the sample is in direct line of sight of the output of DART Source 120. Further, the MS Inlet 210 is disposed such that the same point on the sample is in direct line of sight of the MS Inlet 210.

In some embodiments, the output of DART Source 120 is conveyed toward Sample 110 though a Channel 230. Channel 230 optionally changes direction between DART Source 120 and an output. The output is optionally covered by a Screen 240. Screen 240 can be held at a potential to guide ions to MS Inlet 210, to filter out electrons or to accelerate electrons toward Sample 110. Those embodiments illustrated in FIGS. 2A–2E optionally include Mesh 120 and/or Cover 130.

In some embodiments, more than one DART Source 120 are configured to generate electrons and/or metastables for the analysis of Sample 110. See, for example, FIGS. 2A and 2D.

Some embodiments of the invention include a sample isolation chamber is disposed between DART Source 120 and MS Inlet 210. The sample isolation chamber is optionally used to separate samples such that only one sample is sampled at a time. For example, in some embodiments, a plurality of samples are disposed on a movable sample support. The movable sample support is configured to move members of the plurality of samples, one at a time into a position where they can be analyzed by DART Source 120 and an MS associated with MS Inlet 210. In some embodiments, the movable sample support includes a plurality of dividers disposed to prevent electrons and/or metastables from DART Source 120 from reaching instances of Sample 110 that are not intended to be analyzed at a particular time. In some embodiments, the one or more dividers are configured to be stationary relative to DART Source 120.

In some embodiments, Support 270 is configured to position Sample 110 a well defined distance from DART Source 120 and/or MS Inlet 210. In some embodiments, this well defined distance improves the reproducibility of quantitative measurements. In some embodiments, Support 270 is configured to confine metastables to a defined region.

In various embodiments the dividers are cylinders, glass lined tubes, compartments, containers or the like. The sample dividers are optionally connected by connectors so that the plurality of sample can be passed in front of DART Source 120 and MS Inlet 210 on a tray or a belt. The samples are optionally still open to the atmosphere through gaps between the DART Source 120, MS Inlet 210 and dividers.

Figure 3:
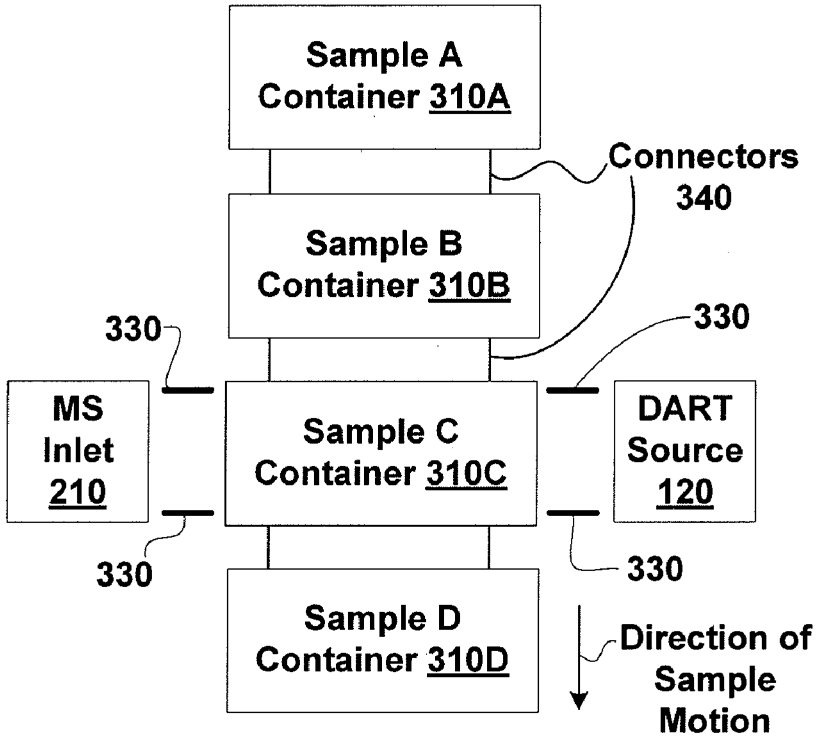
FIG. 3 illustrates a sample analysis system configured for analyzing a plurality of samples, according to various embodiments of the invention.
Figure 2A:
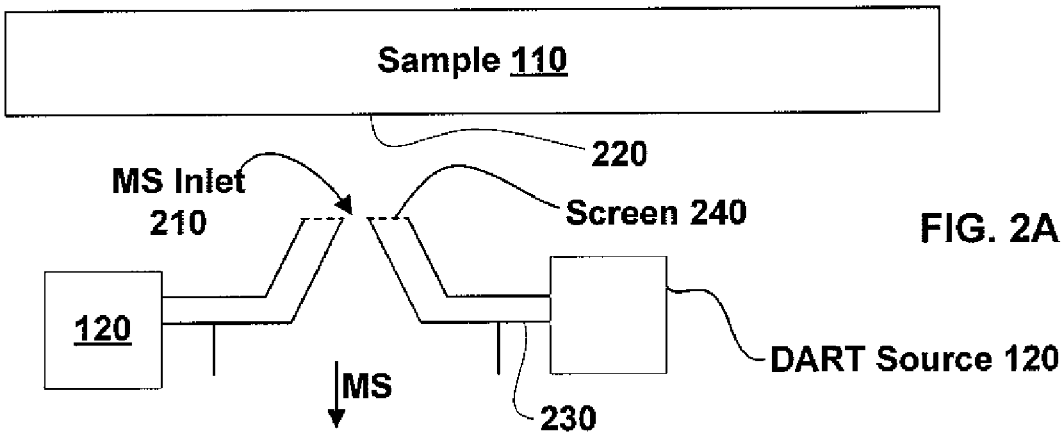
FIGS. 2A–2E illustrate several embodiments in which the output of DART Source 120 and an MS inlet both face the same sample surface.
Figure 2B:
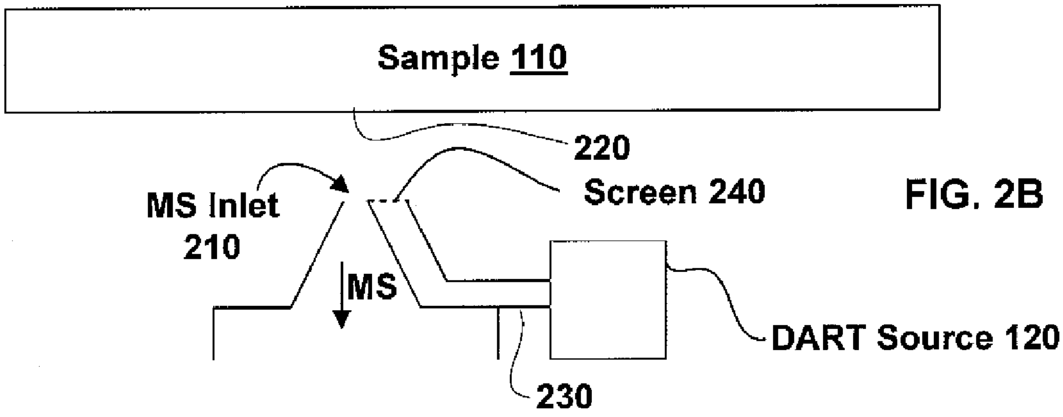
Figure 2C:
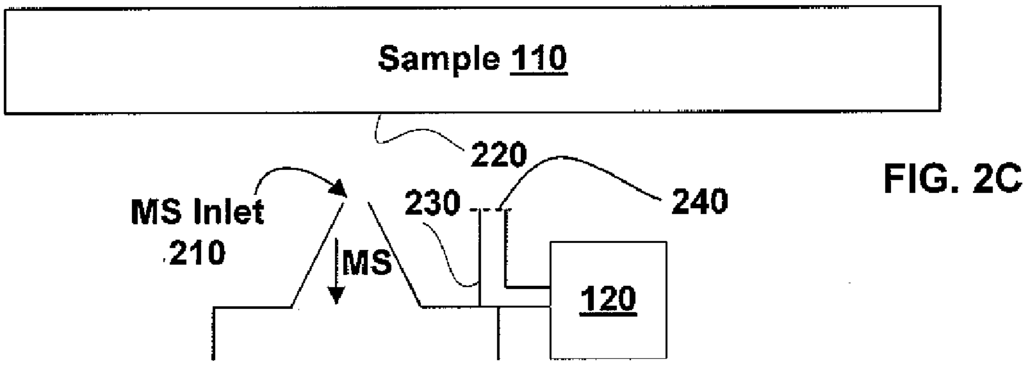
Figure 2D:
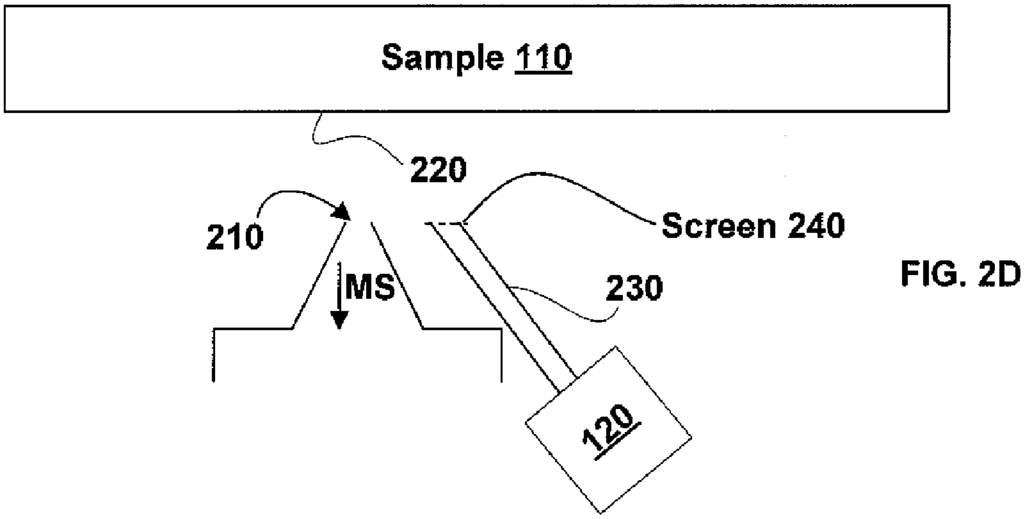
Figure 2E:
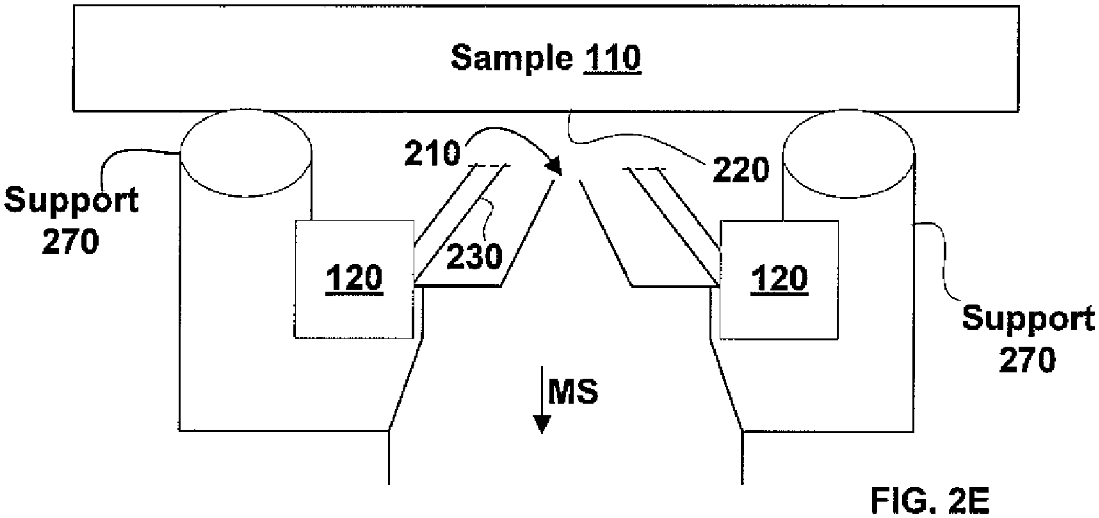

FIG. 3 illustrates an Analysis System, generally designated 300, according to various embodiments of the invention. Analysis System 300 includes a plurality of Sample Containers 310A–310D configured to hold samples to be analyzed. Sample Containers 310A–310D may include wells, vials, trays, slides, cups, sample supports, box, cylinder, or the like. Sample Containers 310A–310D optionally include surfaces (e.g., barriers) configured to restrict the movement of metastables generated using DART Source 120 and/or to restrict movement of ions generated using these metastables. For example, in one embodiment Sample Containers 310A–310D includes a cylinder configured such that metastables from DART Source 120 do not reach a sample B during the analysis of a sample C. (See FIG. 3) This may prevent the generation of ion signal from sample B as interference to the signal from sample C. Sample Containers 310A–310D are optionally coupled by Connectors 340 configured for moving Sample Containers 310A–310D together. In various embodiments, Connectors 340 include a belt, tray, FOUP, rail, conveyor, slot, or the like. Sample Containers 310A–310D are optionally at near atmospheric pressure during analysis.

FIG. 3 illustrates Sample Containers 310 as they may be disposed during analysis of sample C. In this position, metastables and/or electrons are allowed to diffuse from DART Source 120 into Container 310C where they interact with sample C to generate ions that can then reach a mass spectrometer through MS Inlet 210 for analysis. Metastables are prevented from reaching sample B in Container 310 by optional Barriers 330, and/or the walls of Container 310C and/or the walls of Container 310B. When the analysis of sample B is complete Sample Containers 310A–310D are moved into position for the analysis of sample B. This movement may include opening of Container 310B.

In some embodiments, Sample Containers 310A–310D are disposed in configurations such as those illustrated in FIGS. 2A–2E. For example, in some embodiments instances of Support 270 are configured to function as Barriers 330.

One method of the invention includes: a) positioning a first sample within a container relative to an effusive metastable source at atmospheric pressure; b) generating first metastables using the effusive metastable source; c) preventing the first metastables from reaching a second neighboring sample; c) generating first ions from the first sample using the first metastables; analyzing the first ions using a mass spectrometer; d) positioning the second sample relative to the effusive metastable source; e) generating second metastables using the effusive metastable source; f) preventing the second metastables from reaching the first sample; g) generating second ions from the second sample using the second metastables; and analyzing the second ions using the mass spectrometer. The first sample and the second sample optionally being disposed on a sample conveyor.

Figure 4:
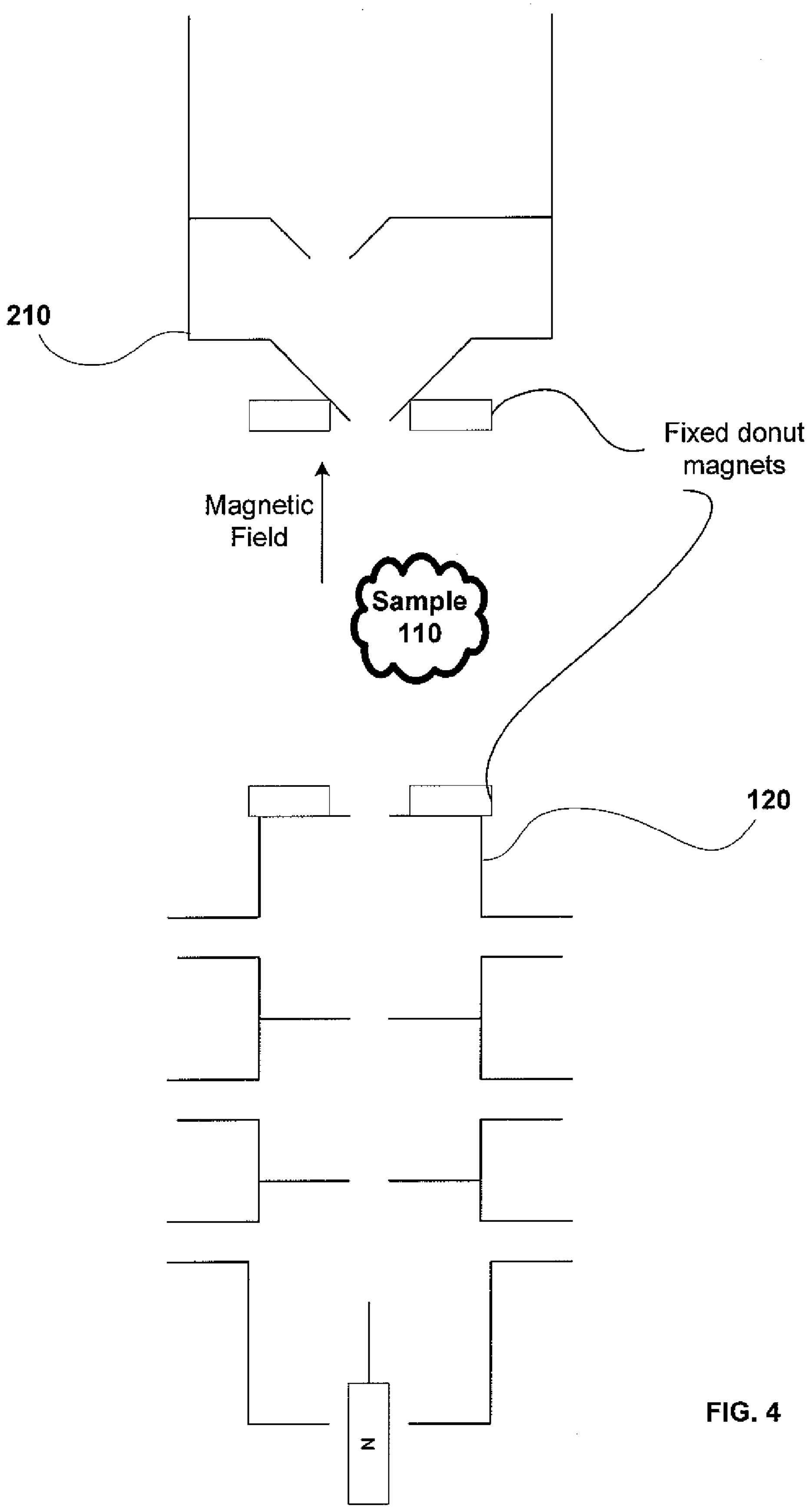
FIG. 4 illustrates an embodiment including a magnetic field configured to direct electrons from a DART source 120 to a sample.

Some embodiments of the invention include the metastable/electron source and MS inlet described in U.S. patent application 2005/0056775 A1 further including the following improvement: a magnetic field to guide electrons from the source to a sample. This magnetic field may be generated using either an electrical current or a fixed magnet. For example, in one embodiment, a fixed donut magnet is placed around DART Source 120 and another fixed donut magnet is placed around MS inlet 210. The resulting magnetic field directs electrons generated at the source to areas from which ions can more easily reach the MS inlet, and to a lesser extent directs ions to the MS inlet, relative to not having the magnetic field. An example is illustrated in FIG. 4.

Figure 5:
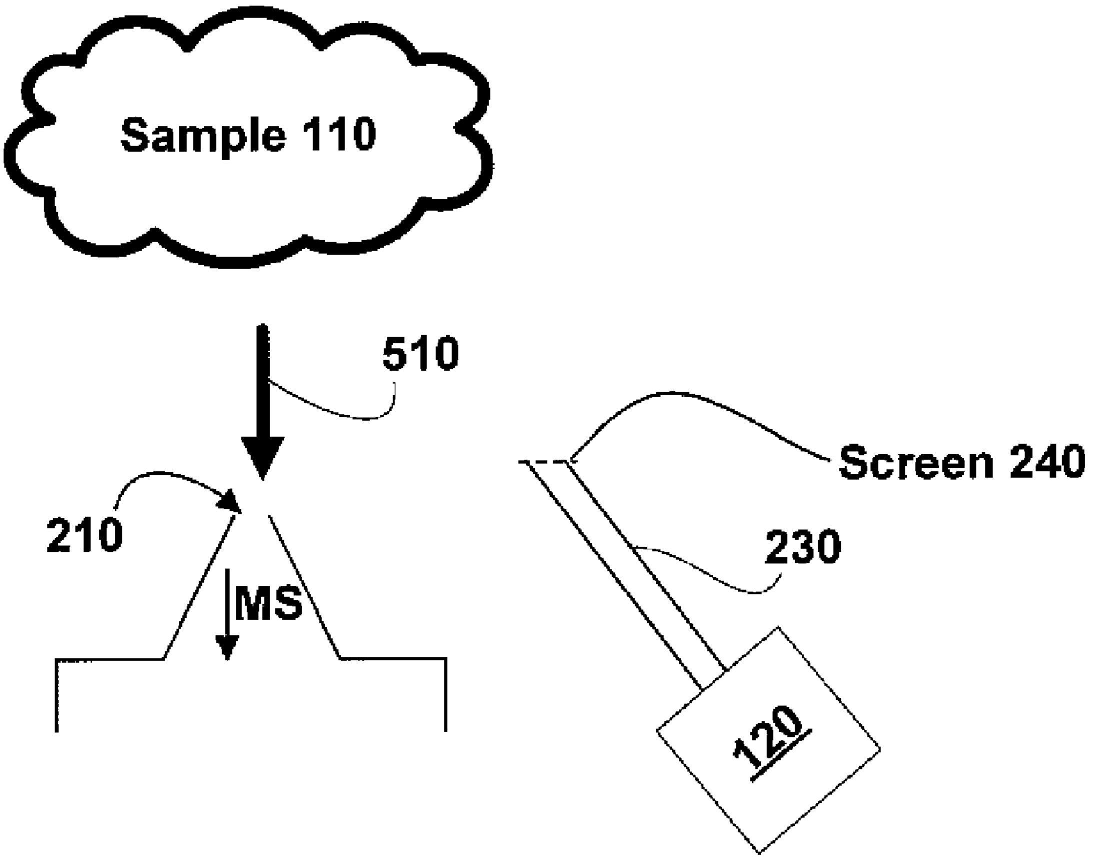
FIG. 5 illustrates embodiments of the invention including an electric or magnetic field configured for directing ions from a sample to a MS inlet, according to various embodiments of the invention.

FIG. 5 illustrates embodiments of the invention including an electric or magnetic field configured for directing ions from Sample 110 to MS inlet 210. These embodiments may take advantage of the fact that metastables generated using DART source 120 are typically neutral species and thus not perturbed by the electric or magnetic field.

In some embodiments of the current invention, the corona or glow discharges taught in U.S. patent application 2005/0056775 A1 are replaced by an atmospheric pressure inductively coupled plasma. An induction coil, rather than a pair of electrodes is optionally used to power this plasma. Thus, some embodiment of the current invention include a non-radioactive atmospheric pressure device for ionization of analytes comprising: a first atmospheric pressure chamber having an inlet for carrier gas and an inductively coupled plasma for creating in the carrier gas metastable neutral excited-state species; a second atmospheric pressure chamber adjacent the first chamber and having a port into the first chamber at one end and having an electrode at the other end and an outlet port for the carrier gas, the ports being sized to restrict flow, said first electrode and ports being substantially aligned; and means for contacting gas containing excited-state species flowing out of the outlet port with an analyte at atmospheric pressure near ground potential.

Some embodiment of the current invention include a non-radioactive atmospheric pressure device for ionization of analytes comprising: a first atmospheric pressure chamber having an inlet for carrier gas and an inductively coupled plasma for creating in the carrier gas metastable neutral excited-state species; a second atmospheric pressure chamber adjacent the first chamber and having a port into the first chamber at one end and an electrode at the other end; a third atmospheric pressure chamber adjacent the second chamber and having a port into the second chamber and an outlet port for the carrier gas, said first electrode, and ports being more or less aligned; and means for contacting gas containing excited-state species flowing out of the outlet port with an analyte at atmospheric pressure near ground potential.

Some embodiment of the current invention include a non-radioactive atmospheric pressure device for ionization of analytes comprising: a first atmospheric pressure chamber having an inlet for carrier gas and an inductively coupled plasma for creating in the carrier gas metastable neutral excited-state species; a second atmospheric pressure chamber adjacent the first chamber and having a port into the first chamber at one end and having an electrode at the other end, and an outlet port for the carrier gas, the ports being sized to restrict flow; and a grounded or charged grid electrode at the output port for emission of charged particles upon contact with an excited-state species, said first electrode and ports being substantially aligned.

Some embodiment of the current invention include a non-radioactive atmospheric pressure device for ionization of analytes comprising: a first atmospheric pressure chamber having an inlet for carrier gas and an inductively coupled plasma for creating in the earner gas metastable neutral excited-state species; a second atmospheric pressure chamber adjacent the first chamber and having a port into the first chamber at one end and having an electrode at the other end, and an outlet port for the carrier gas, the ports being sized to restrict flow; and a grounded or negatively charged grid electrode at the output port for emission of electrons upon contact with excited-state species, said first electrode and ports being substantially aligned.

Some embodiment of the current invention include a non-radioactive atmospheric pressure device for ionization of analytes comprising: a first atmospheric pressure chamber having an inlet for carrier gas and an inductively coupled plasma for creating in the carrier gas metastable neutral excited-state species; a second atmospheric pressure chamber adjacent the first chamber and having a port into the first chamber at one end and an electrode at the other end; a third atmospheric pressure chamber adjacent the second chamber and having a port into the second chamber and an outlet port for the carrier gas; and a grounded or negatively charged grid electrode at the output port for emission of electrons upon contact with excited-state species, said first electrode and ports being more or less aligned.

Some embodiment of the current invention include a non-radioactive atmospheric pressure device for ionization of analytes comprising: a first atmospheric pressure chamber having an inlet for carrier gas and an inductively coupled plasma for creating in the carrier gas metastable neutral excited-state species; a second atmospheric pressure chamber adjacent the first chamber and having a flow restricting port into the first chamber at one end and an electrode at the other end, and having an inlet and outlet for optional cooling of reactant gases; a third atmospheric pressure chamber adjacent the second chamber and having a flow restricting port into the second chamber and having an inlet and outlet for analyte gas or vapor; and an outlet port for ionized products of the interaction of the carrier gas and the analyte gas or vapor, said first electrode and ports being more or less aligned.

Some embodiment of the current invention include a non-radioactive atmospheric pressure device for ionization of analytes comprising: a first atmospheric pressure chamber having an inlet for carrier gas and an inductively coupled plasma for creating in the carrier gas metastable neutral excited-state species; at least one intermediate atmospheric pressure chamber adjacent the first chamber and one of said intermediate chambers having a flow restricting port into the first chamber and having an inlet for optional cooling of reactant gases; a final atmospheric pressure chamber adjacent one of said intermediate chambers and having a port into an intermediate chamber, and having an inlet for analyte gas or vapor; and an outlet port for ionized products of the interaction of the carrier gas and the analyte gas or vapor, said first electrode and ports being substantially aligned.

Various embodiments of the invention include the use of a collision gas that includes excited metastables to cause fragmentation of an analyte in CID. This collision gas is optionally effusive. A collision with an excited metastable can result in a greater amount of energy transfer to the analyte than a collision with an unexcited species of the same mass. Thus, the energy required for a specific type of fragmentation can be received by the analyte through a lower number of collisions. In some embodiments, this allows for a greater amount of fragmentation and/or a greater resolution (as a consequence of fewer collisions). The metastables used for causing fragmentation are generated using DART Source 120, or other means of generating effusive electrons and/or metastables known in the art.

In some embodiments of the invention a multistage mass spectrometer includes a first m/z analyzer configured to separate ions according to their m/z values (or related characteristic), a collision region into which excited metastables or electrons are introduced for collisions with the separated ions, and a second m/z analyzer configured to separate fragments generated by the collisions.

Figure 6:
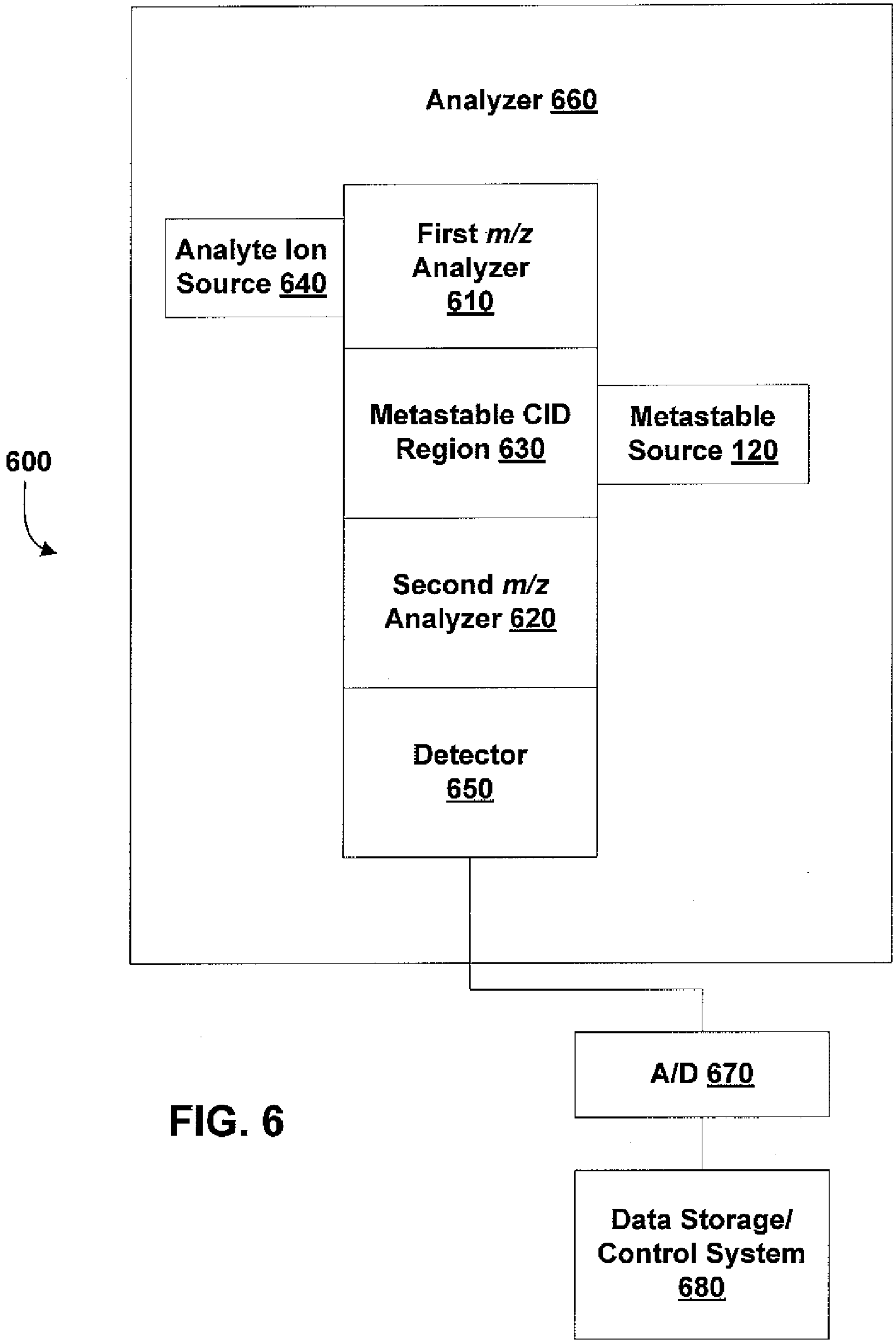
FIG. 6 illustrates embodiments of the invention including a multistage Mass Spectrometer.

FIG. 6 illustrates embodiments of the invention including a multistage Mass Spectrometer generally designated 600. Mass Spectrometer 600 is typically configured to generate MS/MS spectra, and includes a first m/z Analyzer 610 and a second m/z Analyzer r 620 separated by a Metastable CID Region 630. The Metastable CID Region 630 is coupled to a Metastable Source 120, such as the DART system, for the introduction of metastables and/or electrons into the metastable CID region.

Fragmentation occurs when ions separated using m/z Analyzer 610 collide with other species within Metastable CID Regions 630. In some embodiments, these other species include effusive metastables generated using Metastable Source 120. These metastables are configured to provide energy to the separated ions in order to cause fragmentation. In alternative embodiments, these other species include thermal electrons in which case fragmentation may occur as the result of electron capture. (E.g., $Ion^{-}$+electron=>$Ion^{2-}$=>$fragment^{-}$+$fragment^{-}$). In these alternative embodiments, Metastable CID Region 630 and Metastable Source 120 are optionally configured for using effusive electrons rather than metastables.

Analyte ions are introduced into First m/z Analyzer 610 from an Analyte Ion Source 640 and fragment (product) ions resulting from collisions within Metastable CID Region 630 are detected using a Detector 650. Elements 610 through 650 may be considered as part of an Analyzer 660. A signal from Detector 650 is processed by an optional A/D (analog to digital converter) 670 and a Data Storage/Control System 680.

Figure 7:
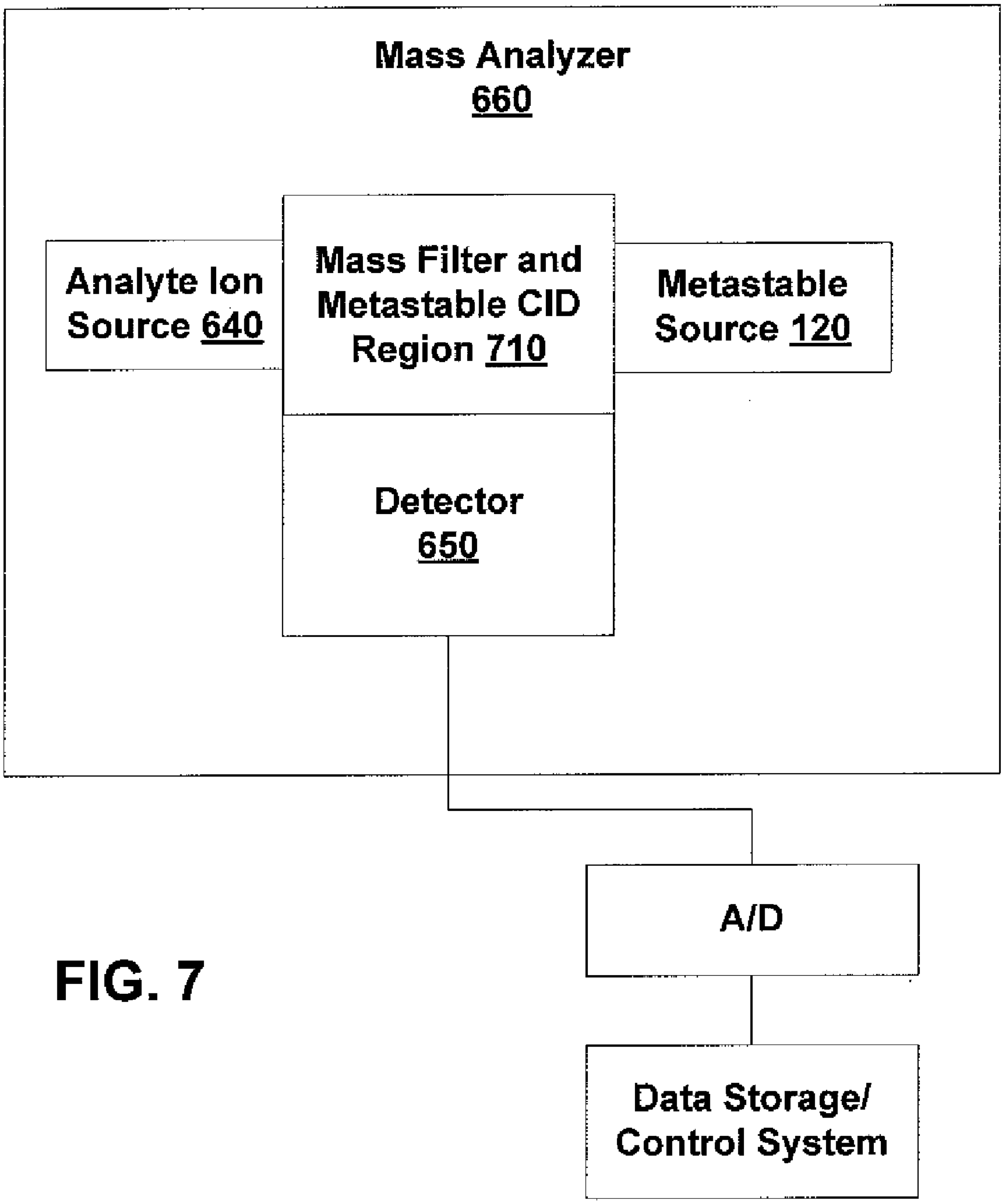
FIG. 7 illustrates embodiments of the invention including an overlapping metastable CID region and m/z analyzer.

In some embodiments, Metastable CID Region 630 is overlapping with First m/z Analyzer 610 and/or Second m/z Analyzer 620. FIG. 7 illustrates some of these embodiments, which may include an ICR cell, 3D and Linear Quadrupole Ion Traps, or Orbitraps forms of m/z analyzers. In these embodiments, the metastable CID region overlaps with an m/z analyzer. These systems may included one m/z analyzer that is applied in different separation steps, as is well known in the art. In various embodiments, a metastable source is used to introduce excited metastables into an ICR, 3D and Linear Quadrupole Ion Traps, or Orbitraps forms of m/z analyzer system for the purpose of generating product ions through collisions with the excited metastables.

In a typical method of using the system of FIG. 7, ions are generated using Analyte Ion Source 640. These ions are then m/z analyzed to determine their m/z values using a combined m/z Analyzer and Metastable CID Region 710. Optionally, ions of selected m/z values are removed from m/z Analyzer and Metastable CID Region 710, using methods known in the art. Excited metastables or electrons are introduced into the m/z Analyzer and Metastable CID Region 710 from Metastable Source 120. Any ions within the m/z analyzer may undergo collisions with the excited metastables or electrons to generate product ions (e.g., fragment ions). The product ions are then analyzed to determine their m/z values. The second m/z values analysis is optionally performed using the same m/z Analyzer and Metastable CID Region 710. This process is optionally repeated in order to accomplish an $MS^n$ analysis.

It is anticipated that this invention is applicable to all MS/MS or $MS^n$ systems that previously used a collision gas that was unexcited. For example, the use of metastable collision gas is applicable to MS/MS or $MS^n$ systems based on FTMS, multiple quadrupoles, ICRMS, TOFMS/MS, or the like. In alternative embodiments, the m/z analyzer is based on time-of-flight, ion cyclotron resonance, ion drift, octapoles, hexapoles, magnetic or electric fields, ion traps, or other means of separating ions as a function of mass or m/z value. The m/z analyzer is optionally replaced by a filter responsive to collisional cross-section of ions.

The excited metastables can include metastable He, Ar, $H_2O$, $H_2$, $NH_3$, $CH_4$, $H_2$, $O_2$, $N_2$ and/or other species known to exist as excited metastables. In some embodiments, the effusive excited metastables are configured to transfer a proton, electron, or other species to an ion. The ion may be positively or negatively charged.

Figure 8:
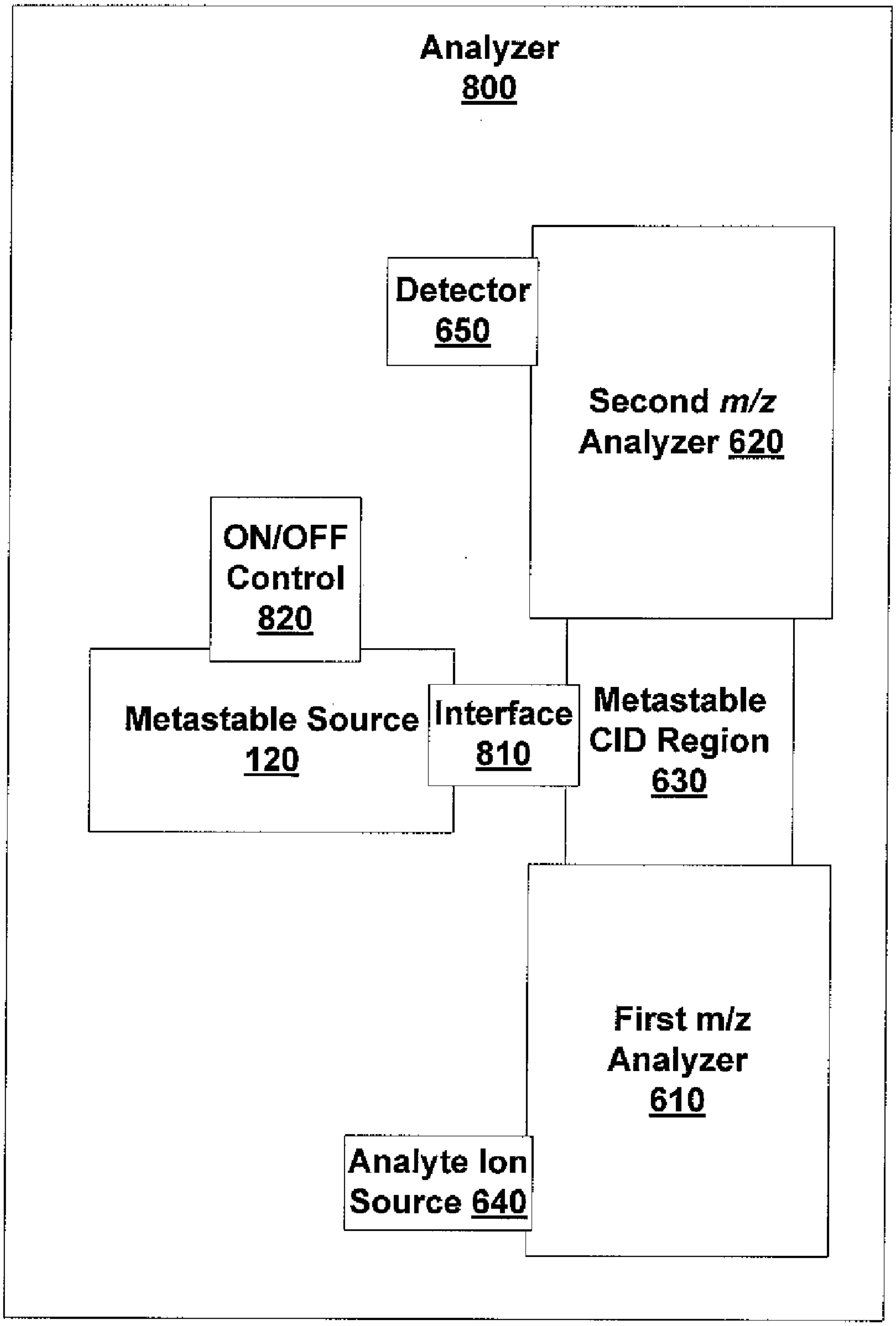
FIG. 8 is a block diagram of a mass spectrometer, according to various embodiments of the invention.

FIG. 8 is a block diagram of an m/z Analyzer 800 according to various embodiments of the invention. m/z Analyzer 800 includes Metastable Source 120, First m/z Analyzer 610, Metastable CID Region 630, and Second m/z Analyzer 620. Metastable Source 120 is optionally coupled to CID Region 120 via an Interface 810. In some embodiments, First m/z Analyzer 610 is optional.

As is described elsewhere herein, Metastable Source 110 is configured to generate metastable species. Metastable species are neutrals or ions with excess internal energy (e.g., excess vibrational, rotational, or electronic energy). The excess internal energy can be transferred to other species, such as ions, through collisions. In the invention this excess internal energy is used to fragment the other species, thus creating product ions. Several types of metastable sources are known in the art. For example, metastable sources, that may be included in Metastable Source 110, are disclosed in U.S. Pat. No. 6,627,881 entitled "Time-of-flight bacteria analyzer using metastable source ionization," and in U.S. Patent Application Publication No. 2005/0056775 entitled "Atmospheric Pressure Ion Source." The disclosures of this patent and this patent application publication are hereby incorporated herein by reference. As is known in the art, metastables can also be generated in plasmas, discharges, or using high energy photos or intense light, chemical reactions, electron beams, or the like. In various alternative embodiments, these approaches to making metastables can be included in Metastable Source 120.

Interface 810, as is further described herein, is configured for introducing metastables generated by Metastable Source 120 to Metastable CID Region 630.

Metastable CID Region 630 is configured to dissociate, e.g., fragment, neutrals or ions by collision with metastables generated using Metastable Source 110. The dissociations can be facilitated by internal energy transfer from the metastables to the species being dissociated. When ions are fragmented, product ions are produced.

Second m/z Analyzer 620 is configured to filter fragments and product ions resulting from the dissociates that occur through collisions with metastables in Metastable CID Region 630. This filtering can include separation in space, in time, in frequency, or the like. Filtering can be on the basis of collisional cross-section, momentum, kinetic energy, mass-to-charge value, charge, mass, or the like. A wide variety of m/z analyzers are known in the art and may be used within Second m/z Analyzer 620.

First m/z Analyzer 610 is configured to filter ions or neutrals prior to fragmentation in Metastable CID Region 630. First m/z Analyzer 610 optionally includes similar type of m/z analyzer as those discussed in relation to Second m/z Analyzer 620.

Detector 650 is configured to detect product ions separated by Second m/z Analyzer 620. Detector 650 can include a photomultiplier, micro-channel plate, or any of the other ion or neutral detectors known in the art for the detection of ions or neutrals. Detector 160 can include detection electronics.

Optional Analyte Ion Source 640 is configured to generate ions that are then fragmented in Metastable CID Region 630. Analyte Ion Source 640 can include a laser, a matrix-assisted laser desorption/ionization (MALDI) source, a chemical ionization (CI or APCI) source, an electron impact ionization source, an electron capture ionization source, a plasma ionization source, a DART source, a desorption electrospray ionization (DESI) source, or any of the other ionization sources known in the art including but not limited to Atmospheric-pressure Solids Analysis Probe (ASAP).

In some embodiments, various combinations of First m/z Analyzer 610, Metastable CID Region 630 and/or Second m/z Analyzer 620 are within the same region. For example, a single ion trap is optionally used to filter ions prior to dissociation, to dissociate ions, and to separate ion product ions resulting from the dissociations. For example, Second m/z Analyzer 620 and Metastable CID Region 630 may be an ion trap within the same region while First m/z Analyzer 610 is a separately disposed m/z analyzer, or vice versa.

m/z Analyzer 800 optionally further includes an ON/OFF Control 820 configured to regulate the introduction of metastables into Metastable CID Region 630. ON/OFF Control 820 is optionally configured to turn on and off metastable generation while maintaining an approximately constant flow of gas into Metastable CID Region 630. In some embodiments, ON/OFF Control 820 is configured to turn on and off power to a discharge, plasma, light source, or other approach to generating metastables. In some embodiments, ON/OFF Control 820 is configured to regulate the flow of gas including metastables into Metastable CID Region 630. In these embodiments, ON/OFF Control 820 is optionally configured to control the pressure in Metastable CID Region 630.

m/z Analyzer 800 is optionally configured to generate MS/MS or $MS^n$ mass spectra. m/z Analyzer 800 can include a time-of-flight ion filter, a magnetic sector, an electric sector, a transmission quadrupole, a 3D or linear quadrupole ion trap, an ICR m/z analyzer, an Orbitrap or other m/z analyzers known in the art.

Metastable Source 120 may be configured to generate metastables at thermal velocities, in a beam, in a flow of carrier gas, in a plasma, as an effusive flow, or the like.

In some embodiments, Metastable CID Region 630 and Metastable Source 120 are at similar pressures. In some embodiments, Metastable CID Region 630 and Metastable Source 120 are at different pressures. In some embodiments, Interface 810 is configured to regulate the flow of metastables and/or gas from Metastable Source 120 into Metastable CID Region 630. In alternative embodiments, Metastable Source 120 is integrated within Metastable CID Region 630.

Figure 9:
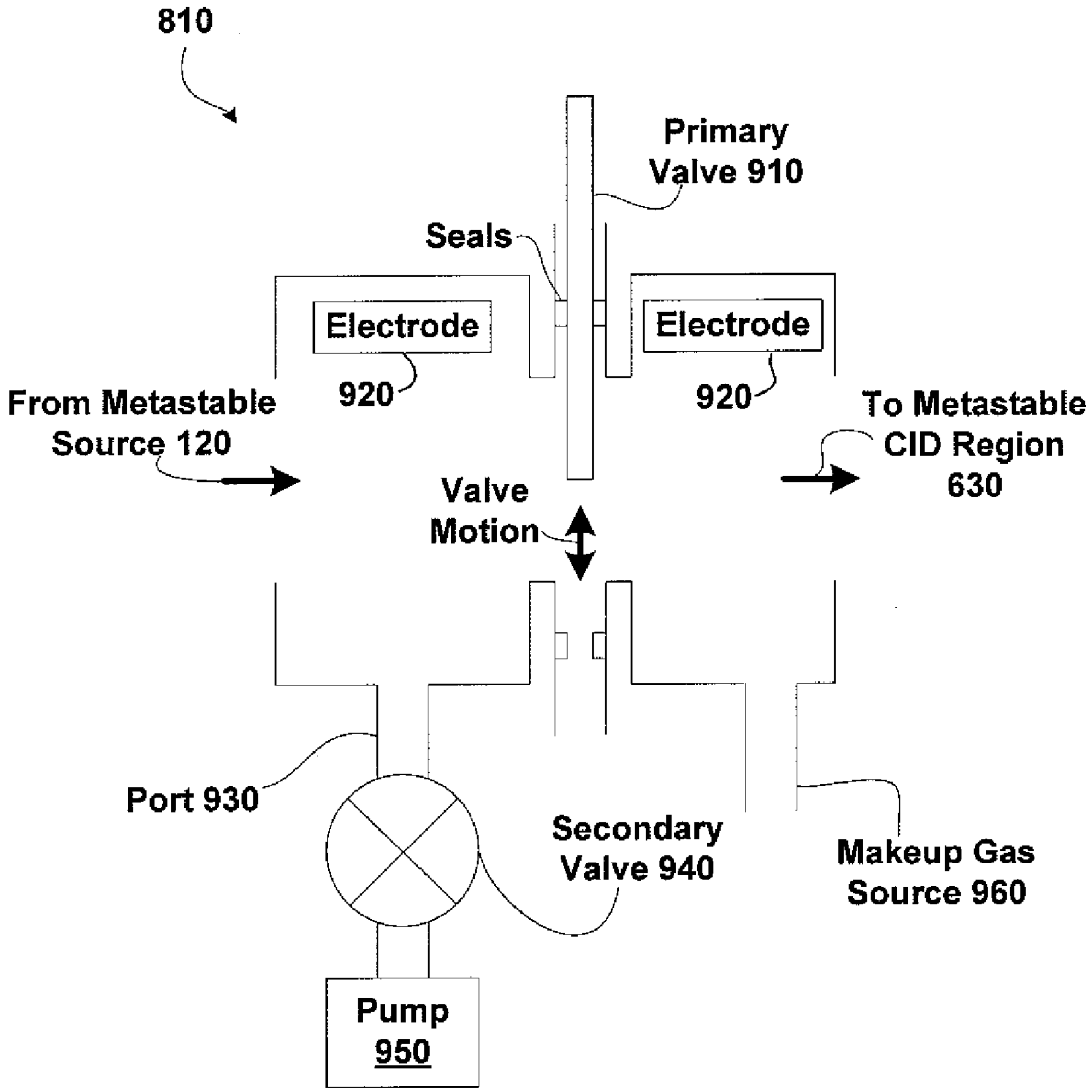
FIG. 9 illustrates an interface, according to various embodiments of the invention.

FIG. 9 illustrates Interface 810, according to various embodiments of the invention. In these embodiments, Interface 810 includes two regions separated by a Primary Valve 910. Primary Valve 910 may be a sliding, swinging, rotating, or other type of valve. Primary Valve 910 is configured to regulate the flow of metastables from Metastable Source 120 to Metastable CID Region 630.

One or more optional Electrodes 920 may be included on either side of the Primary Valve in order to eliminate ions from the flow of metastables using one or more generated electric fields.

An optional Port 930 is associated with a Secondary Valve 940 and a Pump 950. Port 930 can be used for differential pumping.

In some embodiments, Interface 810 includes a Makeup Gas Source 960 configured such that a net gas flow into Metastable CID Region 630 can be maintained at an approximately constant rate as Primary Valve is opened and closed 910. In alternative embodiments, Makeup Gas Source 960 is replaced with a pump configured to perform a similar function. In some embodiments, the make up gas or pump is configured to maintain an approximately constant pressure in Metastable CID Region 630 while the flow of Metastables from Metastable Source 120 to Metastable CID Region 630 is varied.

Figure 10:
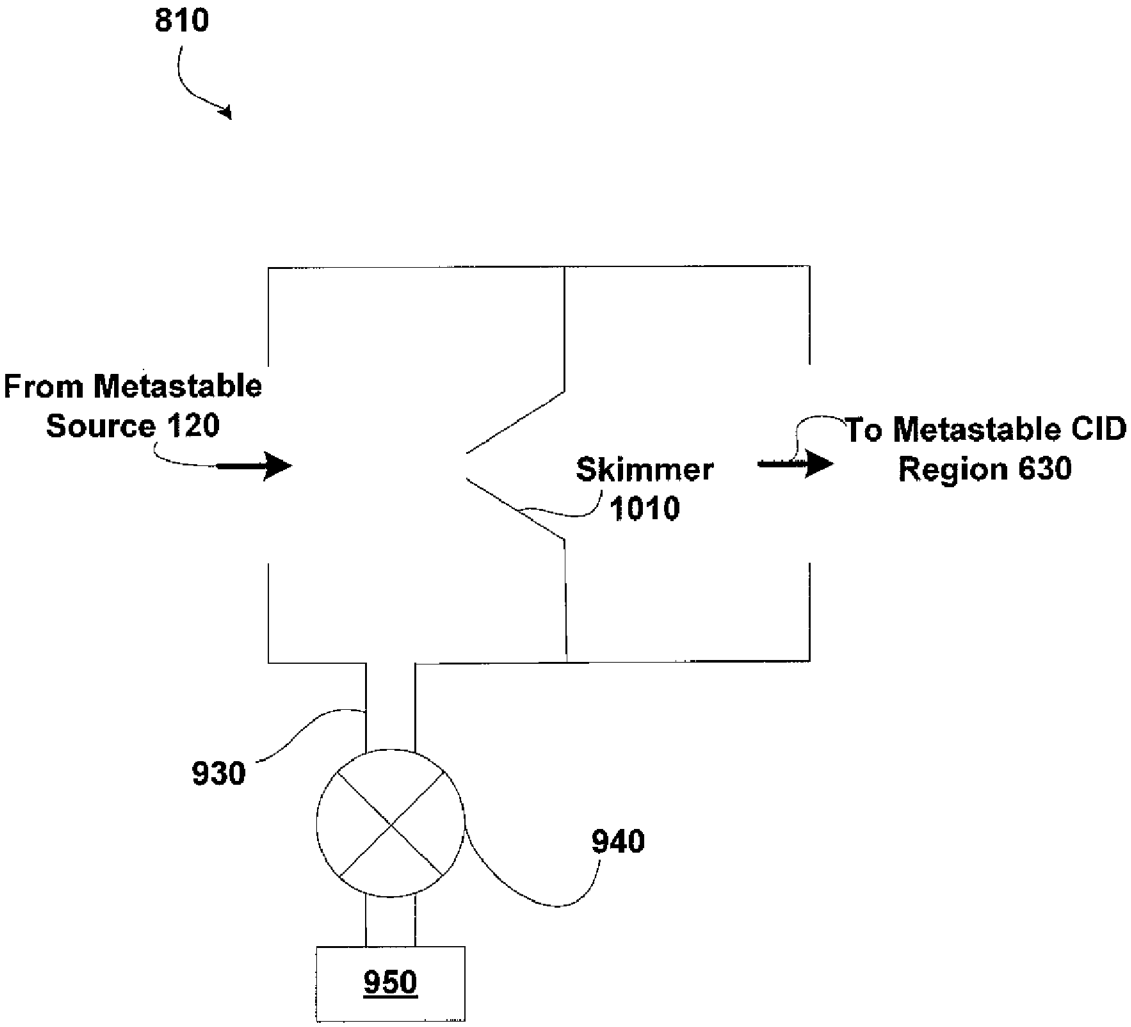
FIG. 10 illustrates an interface including a skimmer, according to various embodiments of the invention.

FIG. 10 illustrates various embodiments of Interface 810 including a Skimmer 1010. In these embodiments, there may be a pressure differential between Metastable Source 120 and Metastable CID Region 630. Skimmer 1010 is optionally replaced by an orifice. The region prior to Skimmer 1010 is optionally differentially pumped through Port 930.

Figure 11:
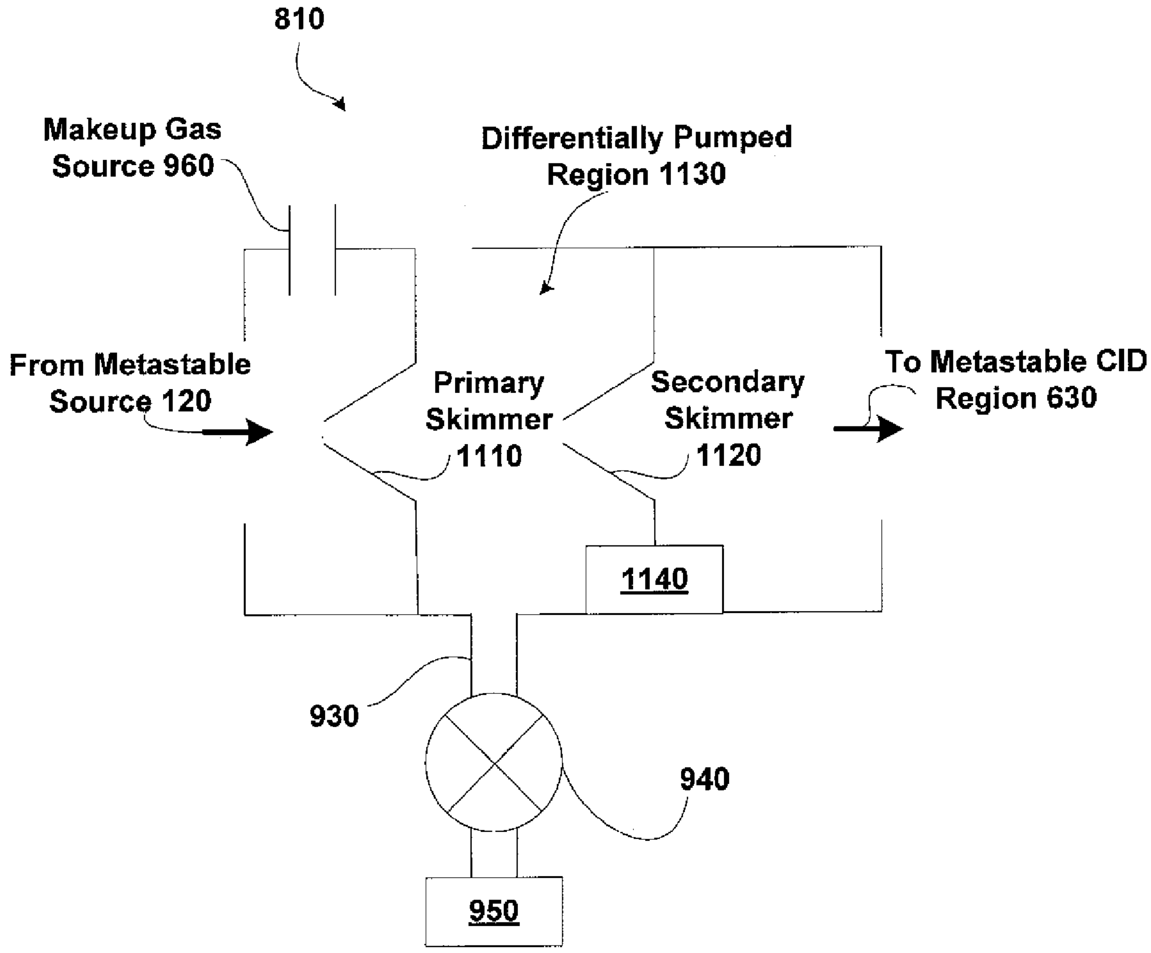
FIG. 11 illustrates an embodiment of an interface that includes a primary skimmer and a secondary Skimmer, according to various embodiments of the invention.

FIG. 11 illustrates an embodiment of Interface 810 that includes a Primary Skimmer 1110 and a Secondary Skimmer 1020, configured to maintain a pressure difference between Metastable Source 120 and Metastable CID Region 630. This embodiment optionally includes a Differentially Pumped Region 1130 between Primary Skimmer 1110 and Secondary Skimmer 1120. This embodiment also optionally includes a Mover 1140 configured to move Primary Skimmer 1110 and Secondary Skimmer 1120 with respect to each other. This movement can be either horizontal and/or vertical in the image of FIG. 11. The size of the orifices within Primary Skimmer 1110 and Secondary Skimmer 1120, conductance of the Secondary Valve 940, the pumping speed of Pump 950, of the like may be used to control the relative pressures between Metastable Source 120 and Metastable CID Region 630.

The embodiments of Interface 810 illustrated in FIGS. 10 and 11 optionally include Makeup Gas Source 960 configured for maintaining an approximately steady flow of gas into (and thus an approximately constant pressure in Metastable CID Region 630 when Metastable Source 120 is turned on and off. In alternative embodiments, the makeup gas inlet can be before both Primary Skimmer 1110 and Secondary Skimmer 1120 (as shown in FIG. 11), between Primary Skimmer 1110 and Secondary Skimmer 1120, or after both Primary Skimmer 1110 and Secondary Skimmer 1120.

Figure 12:
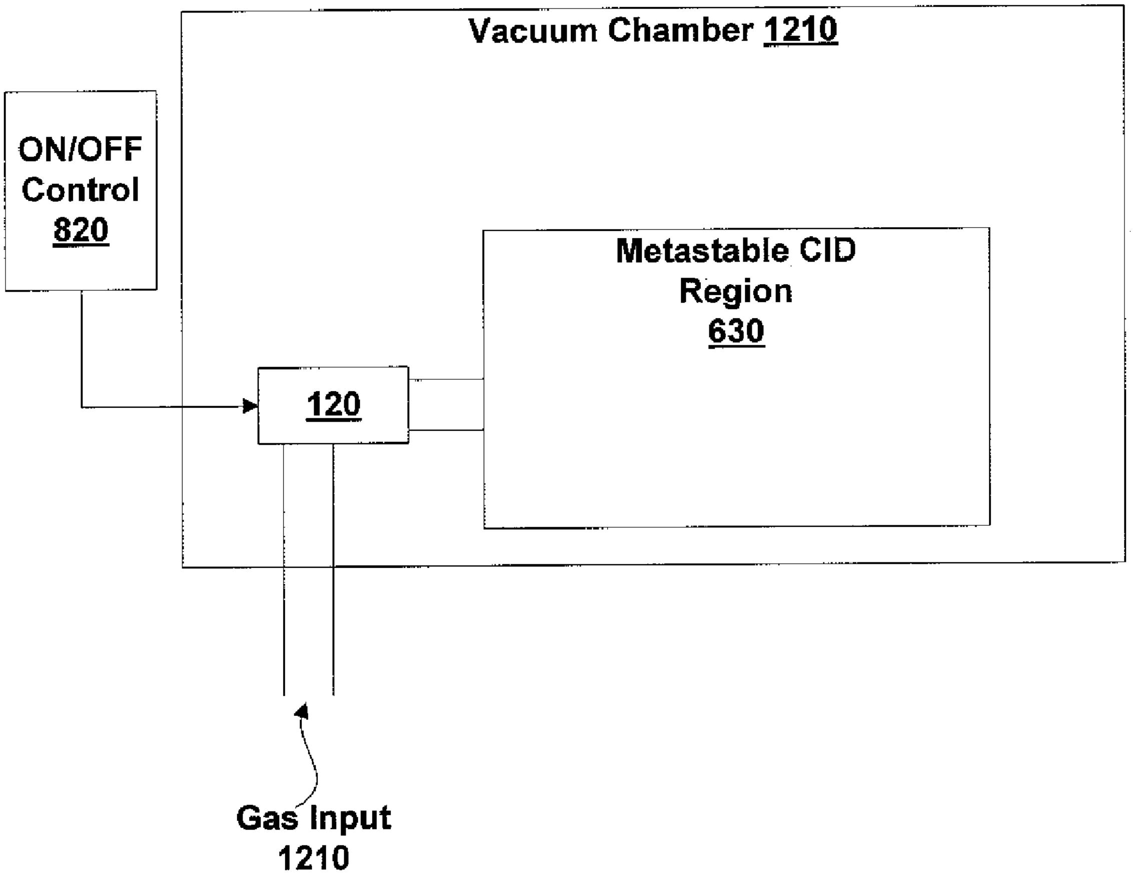
FIG. 12 illustrates an embodiment of the invention wherein a metastable source and a metastable CID Region are both disposed within a vacuum chamber.

FIG. 12 illustrates an embodiment of the invention wherein Metastable Source 120 and Metastable CID Region 630 are both disposed within a Vacuum Chamber 1210. In this embodiment, Interface 810 is optional. A Gas Input 1210 is configured to provide a collision gas to Metastable CID Region 630, optionally through Metastable Source 120. In these embodiments, Metastable Source 120 is configured to generate metastables within the collision gas, or not to do so, responsive to On/Off Control 820. For example, in some embodiments, On/Off Control 820 is configured to turn on and off a discharge, a voltage, or RF filed within Metastable Source 120 in order to turn on and off the production of metastables.

Figure 13:
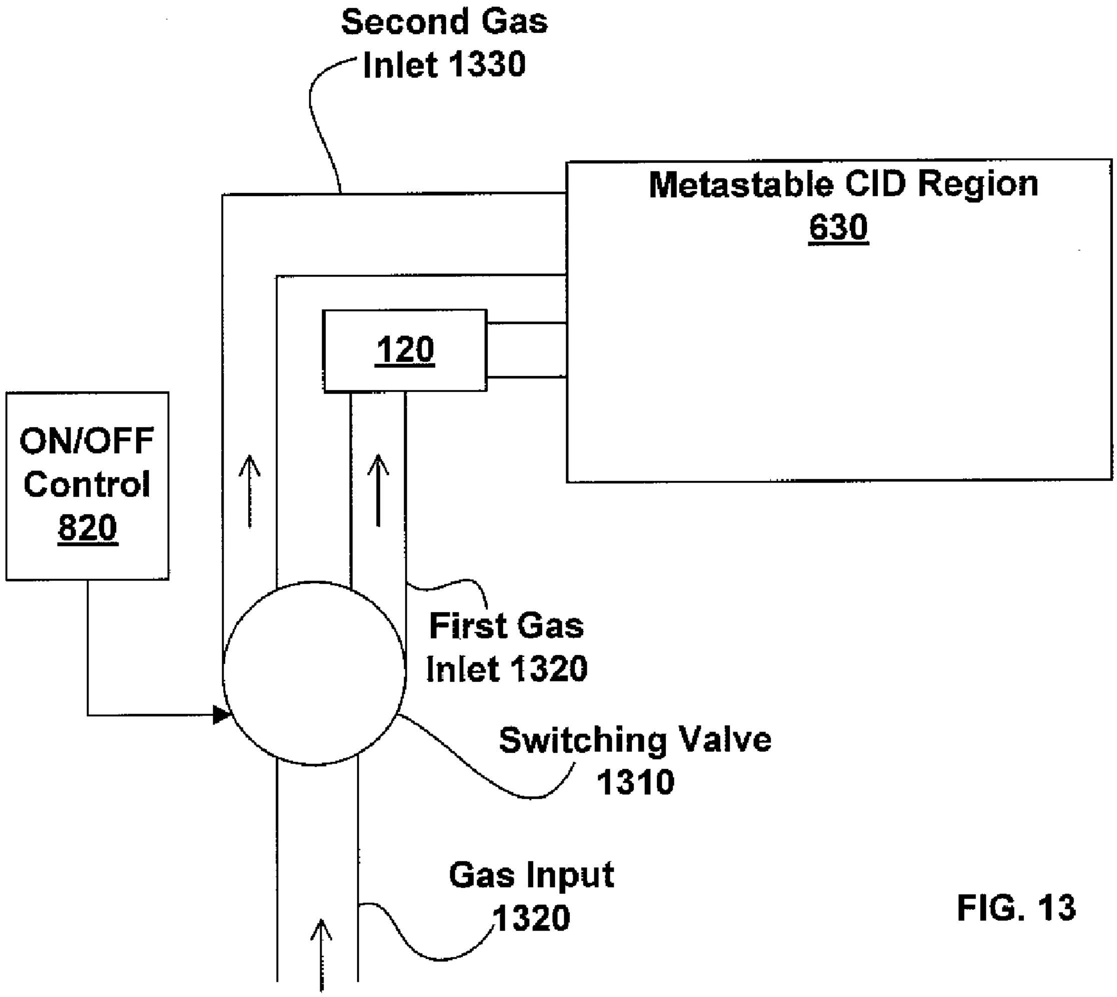
FIG. 13 illustrates an embodiment of the invention including a switching valve.

FIG. 13 illustrates an embodiment of the invention including a Switching Valve 1310 controlled by On/Off Control 820. Switching Valve 1310 is configured to alternatively direct gas received through a Gas Input 1320 to either a First Gas Inlet 1320 or a Second Gas Inlet 1330 to Metastable CID Region 630. Gas directed through First Gas Inlet 1320 is directed through Metastable Source 120 while gas directed through Second Gas Inlet 1330 is not. Thus, when Switching Valve 1310 is set to direct gas through First Gas Inlet 1320 metastables are introduced to Metastable CID Region 630, and when Switching Valve 1310 is set to direct gas through Second Gas Inlet 1330, fewer or no metastables are introduced into Metastable CID Region 630.

In one embodiment of the invention, an analyte is first analyzed while metastables are introduced into Metastable CID Region 630, and then again while a reduced level of metastables or no metastables are introduced into Metastable CID Region 630. The first analysis results in different mass spectra than the second analysis. The differences in these mass spectra are used to discern the molecular structure and/or identity of the analyte. For example, in some embodiments, fragmentation in the presence of metastables may create more fragmentation in primary bonds and/or less rearrangements.

In one embodiment of the invention, metastables of different internal energies are used to generate different fragmentation patterns. For example, a Helium metastable is known to potentially have more internal energy than an Argon metastable. In this embodiment, He and Ar are alternatively introduced into Metastable Source 120 and the differences in the resulting mass spectra are observed.

In some embodiments of the invention, the introduction of metastables into Metastable CID Region 630 is pulsed. For example, in some embodiments, the production of metastables is timed in relation to the production of ions, the selection of ions, and/or data acquisition.

The various features shown in FIGS. 8–13 can be interchanged to generate further embodiments. For example, the embodiments of Interface 810 illustrated by FIGS. 10–13 may also include a Primary Valve 910, Electrode 920, and/or Makeup Gas Source 960, etc.

In various embodiments, Metastable Source 120 is provides an output, including metastables, at a pressure greater than 10, 50, 100, 250 or 500 Torr, while Metastable CID Region 630 is configured to operate at a pressure less than 50, 25, 10, 5 or 1 Torr. For example, in one embodiment, Metastable Source 120 is configured to generate metastables in a region at greater than 50 Torr and Metastable CID Region 630 is configured to operate at less than 50 Torr. In various embodiments, Interface 120 is configured to maintain one, several or all of the various combinations of pressure differences possible using these sets of pressures.

Several embodiments are specifically illustrated and/or described herein. However, it will be appreciated that modifications and variations are covered by the above teachings and within the scope of the appended claims without departing from the spirit and intended scope thereof. For example, while the examples discussed herein have been focused on the DART source taught in U.S. patent application publications 2005/0056775 A1 and 2005/0196871 A1, other effusive sources of metastables or electrons may be substituted in alternative embodiments of the invention. These effusive sources include the DESI source, DAPCI, ELDI and ASAP sources described in “Ambient Mass Spectrometry” by Cooks et al. in *Science* 17 Mar. 2006, vol. 311 pg. 1566–1570. For example in DESI electrons are provided for ionization in the form of a fine spray of charged droplets. See U.S. Patent Application Publication 2005/0230635, the disclosure of which is hereby incorporated herein be reference. Effusive sources are distinguished from other sources by the presence of a carrier gas, by operation at near atmospheric pressures, and/or by velocities that are principally dependent of the local temperature.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A sample imaging system comprising:

an atmospheric pressure source configured to generate electrons or metastables for ionization of sample molecules;

a sample cover including an aperture and configured isolate a region of a solid sample such that ions are generated from the isolated region of the sample but not an other region of the sample, the isolated region of the sample being at atmospheric pressure;

a mechanical element configured to move the relative positions of the aperture and the sample;

an analyzer configured to receive the ions and measure their mass-to-charge values; and a computing system configured to control movement of the mechanical element and to associate the measured mass-to-charge values with a relative location of the aperture and the sample.

2. The system of claim 1, further including a mesh configured to separate the sample cover and the sample.

3. The system of claim 1, further including a mesh configured to separate the sample cover and the sample, the mesh being in contact with the sample and the cover being in contact with the mesh.

4. The system of claim 1, wherein the cover is disposed less than 5 mm from the sample.

5. The imaging system of claim 1, wherein the atmospheric source is configured to generate metastables.

6. The imaging system of claim 1, wherein the atmospheric source is configured to generate electrons in liquid droplets.

7. The system of claim 1, wherein the atmospheric pressure source includes a DART source.

8. The system of claim 1, wherein the atmospheric pressure source includes a DESI source.

9. The system of claim 1, wherein the ions are generated through interaction between the sample and the metastables.

10. The system of claim 1, wherein the ions are generated through interaction between the sample and the electrons.

11. The system of claim 1, wherein the sample cover is in contact with the solid sample.

12. The system of claim 1, wherein the mesh is charged so as to attract electrons or repel ions.

13. A sample imaging system comprising:

a source configured to generate metastables for ionization of sample molecules form a solid sample;

a sample cover including an aperture and configured isolate a region of the solid sample such that ions are generated from the isolated region of the solid sample but not an other region of the sample, the isolated region of the sample being at atmospheric pressure; and a mechanical element configured to move the relative positions of the aperture and the sample.

14. A method of imaging a sample, the method comprising (a) placing the sample in a position relative to a sample cover, the sample cover including an aperture configured to expose a part of a sample to an ionization source while preventing exposure of another part of the sample to the ionization source;

(b) generating metastables or electrons using the ionization source;

(c) generating ions from the part of the sample exposed by the aperture, using the electrons or metastables, the sample being at atmospheric pressure;

(d) measuring the mass-to-charge ratios of the generated ions;

(e) storing the measured mass-to-charge values;

(f) associating the stored mass-to-charge values with the relative position of the sample cover aperture and the sample; and (g) changing the relative positions of the sample cover and the sample; and (h) repeating steps (b) through (g) to form an image of the sample.

15. The method of claim 14, wherein the sample is a solid sample.

16. The method of claim 14, wherein the ionization source includes a DART source.

17. The method of claim 14 wherein the ionization source includes a DESI source.

18. The method of claim 14, further including placing a mesh between the sample and the sample cover.

19. The method of claim 14, wherein generating metastables or electrons includes generating metastables.

20. The method of claim 14, wherein the ions are generated through interaction between the metastables and the sample.

21. A method of analyzing a sample, the method comprising (a) placing the sample in a position relative to a sample cover, the sample cover including an aperture configured to expose a part of a solid sample to an ionization source while preventing exposure of another part of the sample to the ionization source;

(b) generating metastables using the ionization source;

(c) generating ions from the part of the sample exposed by the aperture, using the electrons or metastables, the sample being at atmospheric pressure;

(d) measuring the mass-to-charge ratios of the generated ions; and (e) storing the measured mass-to-charge values.

22. The method of claim 21, wherein the ions are generated through interaction between the sample and the metastables.

23. The method of claim 21, further including placing a mesh between the sample cover and the solid sample.

24. The method of claim 23, wherein the mesh is configured to reduce the flow of gas between the sample and the sample cover.

* * * * *